3,172,920
CATALYTIC PROCESS FOR THE POLYMERIZATION OF OLEFIN HYDROCARBONS
Robert M. Engelbrecht, Charles L. Wiley, and Ronald Galli, El Dorado, Ark., assignors to Monsanto Company, a corporation of Delaware
No Drawing. Filed Jan. 3, 1961, Ser. No. 79,957
12 Claims. (Cl. 260—683.15)

The present invention relates to the catalytic polymerization of olefin hydrocarbons. More particularly, the present invention relates to a process and catalyst therein for the polymerization of mono-olefinic hydrocarbons.

The conversion of olefin hydrocarbons into higher molecular weight polymers is well known. Polymerization may be accomplished by either catalytic or non-catalytic means, but due to the relatively more severe operating conditions necessary for the non-catalytic methods, the majority of olefin polymerization is carried out by catalytic means. The catalysts which have been proposed for the catalytic polymerization of olefins range from adsorbents such as activated clay through mineral acids such as phosphoric and sulfuric acids to Friedel-Crafts type catalysts exemplified by the halides of aluminum and boron. The Friedel-Crafts type catalysts are more active and are more commonly used for polymerization to higher products in and above the lubricating oil range.

It is an object of the present invention to provide a process for the polymerization of olefin hydrocarbons. It is another object of the present invention to provide a process for the polymerization of olefin hydrocarbons to polymers within the molecular weight range of 500 to 2000. It is still a further object of the present invention to provide a new and improved modified Friedel-Crafts type catalyst for the polymerization of olefin hydrocarbons. It is yet another object of the present invention to provide a new and improved modified Friedel-Crafts type catalyst for the polymerization of olefin hydrocarbons to polymers having a molecular weight of 500 to 2000. Additional objects will become apparent from the following description of the invention herein disclosed.

In fulfillment of these and other objects, a process has been discovered wherein polymers of 500 to 2000 molecular weight may be efficiently produced in improved yields by utilizing as a catalyst a Friedel-Crafts type metal halide in admixture with an anhydrous hydrogen halide and a quantity of unreacted metal of the same kind as that contained in the metal halide. More particularly, the present invention comprises, as a first step, the dispersion of a Friedel-Crafts type metal halide together with powdered or granular metal of the same kind as that contained in the metal halide in an inert reaction medium such as n-heptane, n-octane, iso-octane, etc. As a second step, an olefinic feedstock containing polymerizable olefins is introduced concurrently with an anhydrous hydrogen halide into the presence of the metal halide-metal mixture contained in the inert reaction medium, thereby causing the formation of polymers of the polymerizable olefins, the polymers having molecular weights ranging from 500 to 2000. It is not necessary that all of the metal be placed in admixture with the metal halide prior to the beginning of polymerization, since as will be shown later in the specification, excellent results may be obtained by placing only a part of the metal in admixture with the metal halide at the outset and then periodically, during the polymerization period, adding additional quantities of metal. The conditions as to temperatures, pressures, etc., are discussed at length further in this specification but in general will be within the ranges generally known for Friedel-Crafts type catalysts.

The present invention may be more readily understood by reference to the following examples. These examples are not, however, to be construed in any manner as limiting the operation, application and conditions of the present invention.

*Example I*

Approximately 0.5 gram of $AlCl_3$ and 0.3 gram granular metallic aluminum were dispersed in 250 grams of n-heptane in a glass reactor fitted with feed inlet system, a condenser and a stirrer. Next, a gaseous propylene-propane feed comprising 18 weight percent propylene and 82 weight percent propane was introduced into the presence of the $AlCl_3$—Al catalyst concurrently with anhydrous HCl at a rate of 600 cc./minute. The catalyst mass was agitated throughout the addition of the feed. The volume ratio of HCl to hydrocarbon feed was approximately 1 to 50. The temperature of the reaction mass was maintained at 25 to 35° C. throughout the feed addition. The pressure was maintained at atmospheric throughout the addition of the propylene-propane feed. At periodic intervals the unreacted gases were analyzed by gas-liquid partition chromatography to determine the degree of reaction. When the conversion of propylene to polymer dropped below 80% as determined by the analysis of the off-gas, the introduction of the feed was stopped. The polymer formed was recovered and found to have a molecular weight of approximately 730. The yield of polymer represented 83 grams of product per gram of catalyst based on the 0.5 gram of $AlCl_3$ originally present plus the amount of $AlCl_3$ which would be produced if the metallic aluminum was entirely converted to $AlCl_3$.

*Example II*

Approximately 0.5 gram of $AlCl_3$ and 0.3 gram of granular metallic aluminum were dispersed in 250 grams of n-heptane in a glass reactor fitted with a feed inlet system, a condenser and a stirrer. Next, a gaseous propylene-propane feed comprising 18 percent by weight propylene and 82 percent by weight propane was introduced concurrently with anhydrous HCl into the presence of the $AlCl_3$—Al catalyst at a rate of 600 cc. per minute. The catalyst mass was agitated throughout the addition of the feed. The volume ratio of HCl to hydrocarbon feed was approximately 1 to 50. The temperature throughout the addition and reaction of the propylene was 25 to 35° C. and the pressure was atmospheric. During the period of addition and reaction, as the propylene conversion dropped below 90%, 0.2 gram quantities of granular metallic aluminum were added. Thereupon the propylene conversion rose to about 98%. This aluminum addition occurred three times which made the quantity of metallic aluminum used throughout the reaction approximately 0.9 gram. Propylene-propane entry was terminated, when after the last metallic aluminum addition, the propylene conversion dropped below 80%. Propylene conversion was determined as in Example I. The polymer formed was recovered and found to have a molecular weight of approximately 750. The yield of polymer represented 400 grams. This illustrates a catalyst efficiency for propylene conversion of 81 grams of polymer per gram of $AlCl_3$ catalyst, the $AlCl_3$ catalyst including the 0.5 gram originally present plus all that which would be formed if all of the metallic aluminum added was converted to $AlCl_3$.

*Example III*

Approximately 0.5 gram of $AlCl_3$ was dispersed in 250 grams of n-heptane in a glass reactor fitted with a feed inlet system, condenser and stirrer. A gaseous propylene-propane feed comprising 18 weight percent propylene and 82 weight percent propane was passed into contact with the AlCl₃-reaction medium mixture at a rate of 600 cc./minute. The reaction mass was maintained at a temperature of 25 to 30° C. throughout the addition and reaction of the propylene-propane feed. Pressure was approximately atmospheric. Feed entry was terminated when the propylene conversion dropped below 80% the propylene conversion being determined as in Example I. The polymer formed was recovered and found to have a molecular weight of 730. The yield of polymer product represented 46 grams of polymer product per gram of catalyst.

*Example IV*

Approximately 0.5 gram of AlCl₃ was dispersed in 250 grams of n-heptane in a glass reactor fitted with a feed inlet system, condenser and stirrer. Next, a gaseous propylene-propane feed comprising 18 weight percent propylene and 82 weight percent propane was introduced concurrently with anhydrous HCl at a rate of 600 cc./minute into the presence of the catalyst mass. The reaction mass was constantly agitated throughout the feed addition. The HCl-hydrocarbon fed volume ratio was 1 to 50. The temperature was maintained at 25 to 35° C. and the pressure at approximately atmospheric throughout the addition and reaction of the propylene containing feed. The recovered polymer product had a molecular weight of 730 and represented a yield of 56 grams of polymer product per gram of catalyst.

*Example V*

Approximately 0.5 gram of AlCl₃ and 0.3 gram of granular metallic aluminum were dispersed in 250 grams of n-heptane in a glass reactor fitted with a feed inlet system, condenser and stirrer. Next, a gaseous propylene-propane feed comprising 18 weight percent propylene and 82 weight percent propane was introduced at a rate of 600 cc. per minute into the presence of the catalyst. No anhydrous HCl was used. The reaction mass was constantly agitated throughout the feed addition. The temperature was maintained at 25 to 30° C. and the pressure at atmospheric throughout the addition and reaction of the feed. Proplene-propane feed entry was terminated when the propylene conversion dropped below 80%. The polymer product was recovered and found to have a molecular weight of 720. The yield of polymer product represented a catalyst efficiency for propylene conversion above 80%, of approximately 44 grams of product per gram of catalyst.

*Example VI*

Approximately 0.3 gram of granular metallic aluminum were dispersed in 250 grams of n-heptane in a glass reactor fitted with a feed inlet system, condenser and stirrer. Anhydrous HCl was bubbled through the dispersion, with agitation, at a rate of approximately 12 cc./minute for one-half hour. At the end of the period, a gaseous propylene-propane feed comprising 18 percent by weight propylene and 82 percent by weight propane was introduced concurrently with additional anhydrous HCl, with the total flow rate being approximately 600 cc./minute. The volume ratio of HCl to hydrocarbon feed was approximately 1 to 50. The temperature was maintained at 25 to 35° C. and the pressure at atmospheric throughout the addition of the feed. After 3 hours, feed entry was stopped. There was no conversion of propylene to liquid product.

*Example VII*

Propylene polymerization was carried out in the same manner as described in Example III with the exception that the propylene-propane feed rate was 300 cc./hour. Catalyst efficiency for propylene conversion above 80% was 50 grams of polymer per gram of catalyst.

Only Examples I and II illustrate the present invention. Each of these two examples present minor variations in the technique of utilizing the catalytic system of this invention. The catalyst may be used as an AlCl₃-metallic aluminum mixture with the HCl being added with the hydrocarbon feed as exemplified by Example I or additional quantities of metallic aluminum may be periodically added to the catalyst system as exemplified by Example II. The quantity of each separate addition and the number of additions of the additional metallic alumum will vary according to the process variables, such as temperature and pressure and also with the catalytic system employed and the feed hydrocarbon. They must be determined in each particular application but such determination is easily within the ability of one skilled in the art.

Examples III, IV, V, VI and VII serve to amplify the significant advantage to be gained from the utilization of the present invention. Example III illustrates the use of AlCl₃ only, to catalyze the reaction, while Example IV presents the effectiveness of an AlCl₃ catalyst when anhydrous HCl is added with the feed. Example V illustrates an AlCl₃ catalyst in the presence of metallic aluminum but with no anhydrous HCl being fed into the reaction system and Example VI present the results obtained, utilizing metallic aluminum and anhydrous HCl as the catalyzing agents. Example VII presents a variation of Example III. On consideration of the results obtained in the above five Examples III, IV, V, VI, and VII, the advantage to be gained by using the catalytic method of the present invention, exemplified by Examples I and II, is readily apparent.

The catalyst system which is the subject of this invention is an improved modification of a Friedel-Crafts type catalyst. The initial component to the catalyst system may be any of the Friedel-Crafts type metal halides exemplified by AlCl₃, AlBr₃, GaCl₃, TiCl₃, ZnCl₂, etc. The preferred initial component is AlCl₃. To the initial component is added a metallic element corresponding to the metallic portion of the initial component, e.g. metallic aluminum to AlCl₃ or AlBr₃, metallic zinc to ZnCl₂, metallic gallium to GaCl₃, etc. The weight ratio of the metal halide to the elemental metal may range from 0.005:1 to 20:1, with a more preferred ratio being from 0.05:1 to 5:1. If it is desired to add metal during the progress of the reaction, the metal added must be the same as that initially mixed with the original Friedel-Crafts component. The final component to the catalyst system in the anhydrous hydrogen halide. It is preferred that the hydrogen halide correspond to the halogen portion of the Friedel-Crafts type component, e.g. HCl with AlCl₃, HBr with AlBr₃, etc. The anhydrous hydorgen halide is introduced into and as part of the catalyst system concurrently with the energy of the hydrocarbon feed. The ratio of anhydrous hydrogen halide to hydrocarbon feed may range from 1:20 to 1:1000 by volume. A more preferred ratio, however, would be one of approximately 1:35 to 1:200 by volume.

In the practice of the present invention, mono-olefin hydrocarbons of 2 to 18 carbon atoms and higher may be polymerized. It is, however, more preferred and more practical to use those feedstocks containing mono-olefin hydrocarbons of 2 to 8 carbon atoms. The mono-olefin hydrocarbons may be either straight-chain or branched-chain and may be either terminally or internally unsaturated. The feedstock may be one containing relatively small amounts of the above described polymerizable hydrocarbons or may be made up entirely of such materials. It is preferred to have a feedstock containing no less than 5% of the polymerizable hydrocarbons, however. The impurities which may be present in the feedstreams which may be utilized in the present process may be n-paraffins, iso-paraffins or, generally, the same impurities as may be tolerated by the Friedel-Crafts catalysts known to the prior art.

The products which may be produced utilizing the present invention are polymers having molecular weights of 500 to 2000 and higher. These polymers find excellent utility as additives to lubricating oils, asphalt blending, adhesive compositions, in manufacture of caulking and sealing compounds, etc. The degree of polymerization will depend upon the temperatures, pressures and the length of contact time between the reactants and the catalyzing agents.

The temperatures at which the present invention is operable may range broadly from $-100$ to $+100°$ C. A more preferred temperature range, however, is to be found from approximately $-50°$ to $75°$ C. and a still more preferred temperature range from $0°$ C. to approximately $50°$ C. The affect of the temperature on polymerization as carried out in accordance with the present invention, is much the same as those of prior art polymerization processes utilizing Friedel-Crafts type catalysts. This is to say that, generally, as temperatures are decreased the molecular weight of polymer product is increased.

In operating the present invention, pressures of from atmospheric to 1000 p.s.i.g. may be utilized. However, it is much preferred to operate the invention as near to atmospheric pressure as possible though pressures up to and including 500 p.s.i.g. are within the preferred range. As with temperature, the effect of pressure is much the same as in prior art Friedel-Crafts catalyst polymerization reactions.

The method of contacting the catalyst with the hydrocarbon feed mixture is not critical and may be any known method such as continuous, semi-continuous or batch. If continuous or semi-continuous operations are used, then space velocities and residence time of the reactants in the polymerization zone will be of some criticality. These variables will differ considerably for the feedstocks and specific method of contact and will have to be determined individually for each system for optimum results. Determination of the optimum space velocities and residence times for any of the catalyst is well within the ability of those skilled in the art. In many instances prior polymerization art may provide a guide for the determination of space velocity and residence time ranges. If batch type contacting operations are preferred, the length of time of contact will vary depending on the efficiency of contact, feedstock, ratio of catalyst to feed, temperature, pressure, etc., but will generally be within the range of 0.5 to 24 hours. Optimum length of contact time for batch operations may be determined with little difficulty by those skilled in the art, however.

What is claimed is:

1. A process for the polymerization of polymerizable olefin hydrocarbons consisting of contacting a feedstream consisting essentially of mono-olefin hydrocarbons of 2 to 8 carbon atoms concurrently with an anhydrous hydrogen halide in a gaseous volume ratio of hydrogen halide to feedstream of 1:20 to 1:1000, at a temperature of $-100$ to $+100°$ C., a pressure of atmospheric to 1,000 p.s.i.g. and under substantially anhydrous conditions with a catalyst comprising a Friedel-Crafts metal halide selected from the group consisting of $AlCl_3$, $AlBr_3$, $GaCl_3$, $TiCl_3$, and $ZnCl_2$, in admixture with a metal in a weight ratio of metal halide to metal of 0.005:1 to 20:1, the metal being the same as that contained in said metal halide and with said hydrogen halide containing the same halide as that in the Friedel-Crafts metal halide, and thereby causing the mono-olefin hydrocarbons to form polymers having a molecular weight of 500 to 2,000.

2. The process of claim 1 wherein the reaction is carried out in an inert hydrocarbon medium.

3. The process of claim 1 wherein the weight ratio of metal halide to metal is 0.05:1 to 5:1.

4. The process of claim 1 wherein the Friedel-Crafts metal halide is aluminum trichloride.

5. The process of claim 1 wherein the Friedel-Crafts metal halide is gallium trichloride.

6. The process of claim 1 wherein the volume ratio of anhydrous hydrogen halide to hydrocarbon feed is 1:35 to 1:200.

7. The process of claim 1 wherein the temperature is $-50$ to $75°$ C. and the pressure is atmospheric to 500 p.s.i.g.

8. The process of claim 1 wherein the Friedel-Crafts metal halide is aluminum tribromide.

9. A process for the polymerization of polymerizable olefin hydrocarbons consisting of contacting a feedstream consisting essentially of mono-olefinic hydrocarbons of 2 to 8 carbon atoms concurrently with anhydrous HCl at a temperature of $-50$ to $75°$ C. and at a pressure of atmospheric to 500 p.s.i.g. under substantially anhydrous conditions with a catalyst dispersed in an inert hydrocarbon medium, said catalyst comprising $AlCl_3$ in admixture with metallic aluminum in a weight ratio of 0.05:1 to 5:1, thereby causing the polymerization of the mono-olefinic hydrocarbons to polymers having a molecular weight of 500 to 2000.

10. The process of claim 9 wherein the feedstream is a propylene containing feedstream.

11. The process of claim 10 wherein the temperature is 0 to $50°$ C. and the pressure is atmospheric.

12. The process of claim 10 wherein the weight ratio of $AlCl_3$ to metallic aluminum is approximately 1.6 to 1.

References Cited by the Examiner

UNITED STATES PATENTS

| | | | |
|---|---|---|---|
| 2,055,875 | 9/36 | Morrell | 260—683.15 |
| 2,084,501 | 6/37 | Otto et al. | 260—683.15 |
| 2,181,640 | 11/39 | Deanesly et al. | 260—683.15 |
| 2,355,339 | 8/44 | Story | 260—683.53 |
| 2,517,692 | 8/50 | Mavity | 260—683.15 |
| 2,678,957 | 5/54 | Fontana et al. | 260—683.15 |

ALPHONSO D. SULLIVAN, *Primary Examiner.*

MILTON STERMAN, *Examiner.*